(12) United States Patent
Yang

(10) Patent No.: US 9,103,379 B2
(45) Date of Patent: Aug. 11, 2015

(54) CONTROLLABLE COMPOSITE CLUTCH HAVING LIMITED TORQUE WHILE BEING IN RELEASED STATE

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 148 days.

(21) Appl. No.: 13/859,847

(22) Filed: Apr. 10, 2013

(65) Prior Publication Data

US 2013/0270052 A1 Oct. 17, 2013

Related U.S. Application Data

(63) Continuation-in-part of application No. 13/444,068, filed on Apr. 11, 2012, now Pat. No. 8,474,344.

(51) Int. Cl.
*F16H 59/00* (2006.01)
*F16D 7/00* (2006.01)
*F16D 47/00* (2006.01)
*F16D 47/04* (2006.01)

(52) U.S. Cl.
CPC *F16D 7/00* (2013.01); *F16D 47/00* (2013.01); *F16D 47/04* (2013.01)

(58) Field of Classification Search
USPC .............................. 74/330, 331, 333, 340, 335
See application file for complete search history.

(56) References Cited

U.S. PATENT DOCUMENTS

| | | | |
|---|---|---|---|
| 6,766,705 B1 * | 7/2004 | Hall, III | 74/331 |
| 7,077,024 B2 * | 7/2006 | Lauri et al. | 74/325 |
| 8,066,606 B2 * | 11/2011 | Dittrich et al. | 475/218 |
| 8,146,451 B2 * | 4/2012 | Van Druten et al. | 74/330 |

* cited by examiner

*Primary Examiner* — Ha D Ho
(74) *Attorney, Agent, or Firm* — Bacon & Thomas, PLLC

(57) ABSTRACT

A controllable composite clutch having limited torque while being in a released state, in which a clutch capable of being controlled for performing engaging/releasing function and a physical limited torque device having relatively smaller torque being axially installed between an input/output shaft and an output shaft, or being radially installed between an input shaft and a cylindrical outputting rotation part; so that when the clutch is controlled to be in an engaged state, the rotary kinetic energy between the input shaft and the output shaft is transferred through the clutch; and when the clutch is controlled to be in a released state, the physical limited torque device performs limited torque coupling, such that the rotary kinetic energy between the input shaft and the output shaft can continue to be transferred and the slip rotational speed differential is generated due to over-torque can be carried out by smaller set torque.

14 Claims, 2 Drawing Sheets

CONTROLLABLE COMPOSITE CLUTCH HAVING LIMITED TORQUE WHILE BEING IN RELEASED STATE

CROSS REFERENCE TO RELATED APPLICATION

This is a Continuation-In-Part of application Ser. No. 13/444,068, filed on Apr. 11, 2012.

BACKGROUND OF THE INVENTION (a) Field of the Invention

The present invention relates to a controllable composite clutch having limited torque while being in a released state, wherein when the clutch is released from an engaging transmission state, a physical limited torque smaller than the engaging torque can still be provided for application.

(b) Description of the Prior Art

A conventional controllable clutch is only equipped with a transmission switch function of engaging or releasing, thus very little function can be provided.

SUMMARY OF THE INVENTION

The present invention provides a controllable composite clutch having limited torque while being in a released state, in which a clutch capable of being controlled for performing engaging/releasing function and a physical limited torque device having relatively smaller torque being axially installed between an input/output shaft and an output shaft, or being radially installed between an input shaft and a cylindrical outputting rotation part; so when the clutch is controlled to be in an engaged state, the rotary kinetic energy between the input shaft and the output shaft is transferred through the clutch; when the clutch is controlled to be in a released state, the physical limited torque device performs limited torque coupling, such that the rotary kinetic energy between the input shaft and the output shaft can continue to be transferred and the slip rotational speed differential is generated due to over-torque can be carried out by smaller set torque; the mentioned physical limited torque is smaller than the engaging torque of the clutch.

Figure 1:
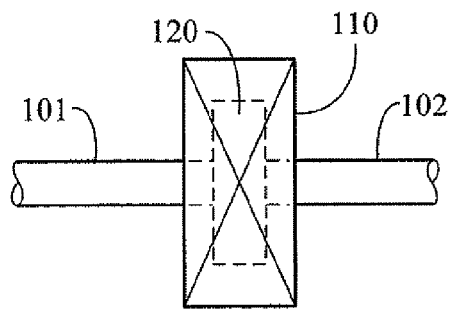
FIG. 1 is a schematic view showing the axial type composite structure, according to the present invention.

DESCRIPTION OF MAIN COMPONENT SYMBOLS 101, 201: Input shaft
102: Output shaft
111: Relay input shaft
112: Relay output shaft
110: Axial clutch
120: Limited torque device
113: Active end transmission
114: Passive end transmission
202: Cylindrical outputting rotation part
210: Radial clutch
220: Radial limited torque device

DETAILED DESCRIPTION OF THE PREFERRED EMBODIMENTS

A conventional controllable clutch is only equipped with a transmission switch function of engaging or releasing, thus very little function can be provided.

The present invention provides a controllable composite clutch having limited torque while being in a released state, in which a clutch capable of being controlled for performing engaging/releasing function and a physical limited torque device having smaller torque being axially installed between an input/output shaft and an output shaft, or being radially installed between an input shaft and a cylindrical outputting rotation part; so when the clutch is controlled to be in an engaged state, the rotary kinetic energy between the input shaft and the output shaft is transferred through the clutch; when the clutch is controlled to be in a released state, the physical limited torque device performs limited torque coupling, such that the rotary kinetic energy between the input shaft and the output shaft is continued to be input or the slip rotational speed differential being generated due to over-torque can be carried out by smaller set torque; the physical limited torque of the mentioned limited torque device (120) is smaller than the engaging torque of the clutch.

FIG. 1 is a schematic view showing the axial type composite structure, according to the present invention;

As shown in FIG. 1, it mainly consists of:

input shaft (101): constituted by a shaft or rotary structure capable of inputting the rotary kinetic energy, and served to be combined at the input end of the axial clutch (110) and at the input end of the limited torque device (120);

output shaft (102): constituted by a shaft or rotary structure capable of outputting the rotary kinetic energy, and served to be combined at the output end of the axial clutch (110) and at the output end of the limited torque device (120);

axial clutch (110): related to a clutch device or a single-way clutch, controlled by manual force or centrifugal force, or controlled by the electric force, and/or magnetic force, and/or mechanical force, and/or air pressure and/or hydraulic force; when being in an engaged state, the axial clutch (110) is served to transfer the rotary kinetic energy between the input shaft (101) and the output shaft (102), and when the axial clutch (110) being in a released state, served to terminate the transmission of the rotary kinetic energy between the input shaft (101) and the output shaft (102), and the smaller set torque is via the limited torque device (120) to continue transferring the rotary kinetic energy and generating the slip rotational speed differential due to over-torque;

limited torque device (120): related to a limited torque device constituted by preload friction, viscous force or fluid damping force, or a controllable limited torque structure controlled by manual force or centrifugal force, or controlled by the electric force, and/or magnetic force, and/or mechanical force, and/or air pressure and/or hydraulic force, equipped with the characteristic of limited torque, wherein the limited torque coupling is performed by the physical limited torque device, such that the rotary kinetic energy between the input shaft (101) and the output shaft (102) can be transferred through smaller torque, or the slip rotational speed differential between the input shaft (101) and the output shaft (102) is generated due to over-torque; the mentioned physical limited torque is smaller than the engaging torque of the axial clutch (110);

When being applied, the inputting and the outputting function of the mentioned input shaft (101) and the output shaft (102) can be switched to input the rotary kinetic energy through the output shaft (102) and output the rotary kinetic energy from the input shaft (101).

Figure 2:
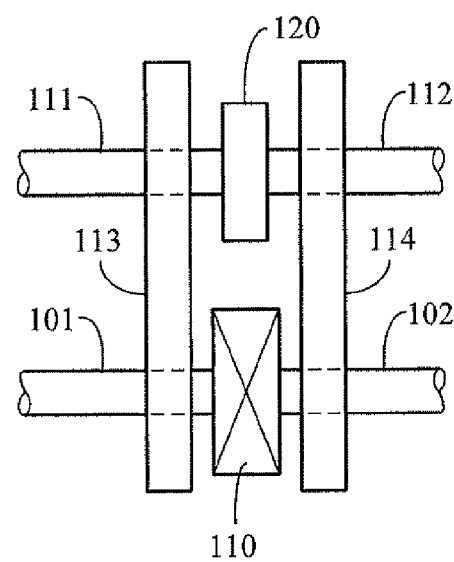
FIG. 2 is a schematic view showing the multi-shaft connecting type composite structure, according to the present invention.

According to the controllable composite clutch having limited torque while being in a released state provided by the present invention, a multi-shaft parallel-connected transmission structure having the same function can be adopted, thereby meeting the requirement of the applied space;

FIG. 2 is a schematic view showing the multi-shaft connecting type composite structure, according to the present invention;

As shown in FIG. 2, two transmission ends of the axial clutch (110) are respectively combined with the input shaft (101) and the output shaft (102), and two transmission ends of the limited toque device (120) are respectively combined with the relay input shaft (111) and the relay output shaft (112); the rotary kinetic energy between the input shaft (101) and the relay input shaft (111) is transferred through the active end transmission (113), and the rotary kinetic energy between the output shaft (102) and the relay output shaft (112) is transferred through the passive end transmission (114), wherein the input shaft (101) revolves in the same rotating direction relative to the output shaft (102), the relay input shaft (111) revolves in the same rotating direction relative to the relay output shaft (112), the speed ratio between the input shaft (101) and the relay input shaft (111) and the speed ratio between the output shaft (102) and the relay output shaft (112) are the same, and the speed ratio between the input shaft (101) and the relay input shaft (111) and the output shaft (102) and the relay output shaft (112) can be determined according to actual needs.

When being applied, the inputting and the outputting function of the mentioned input shaft (101) and the output shaft (102) can be switched to input the rotary kinetic energy through the output shaft (102) and output the rotary kinetic energy from the input shaft (101).

Figure 3:
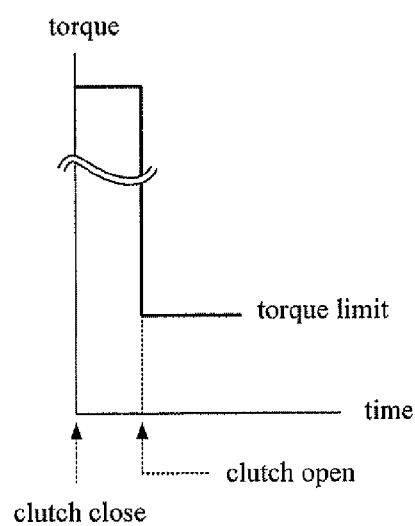
FIG. 3 is a schematic view illustrating the operation characteristic of the limited torque being set as a fixed torque, according to the present invention.
Figure 4:
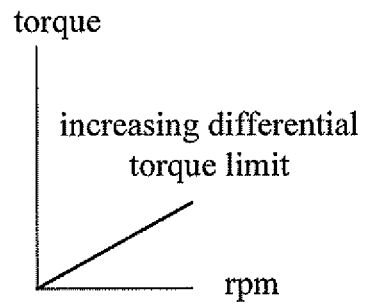
FIG. 4 is a schematic view illustrating the operation characteristic of the limited torque being gradually increased while the rotation differential being increased, according to the present invention.
Figure 5:
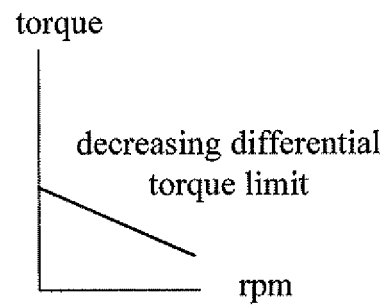
FIG. 5 is a schematic view illustrating the operation characteristic of the limited torque being gradually reduced while the rotation differential being increased, according to the present invention.

The mentioned limited torque device (120) shown in FIG. 1 and FIG. 2 is equipped with one or more than one of the following characteristics:

(1) a limited torque device having the set torque, e.g. configured by a pre-stressed limited torque structure; FIG. 3 is a schematic view illustrating the operation characteristic of the limited torque being set as a fixed torque, according to the present invention;

(2) a limited torque device having the gradually-increased torque while the rotation differential being increased, e.g. configured by an eddy current coupling device or viscous oil coupling device; FIG. 4 is a schematic view illustrating the operation characteristic of the limited torque being gradually increased while the rotation differential being increased, according to the present invention;

(3) a limited torque device having the gradually-reduced torque while the rotation differential being increased, e.g. configured by a sliding friction disc or hydraulic coupling device; FIG. 5 is a schematic view illustrating the operation characteristic of the limited torque being gradually reduced while the rotation differential being increased, according to the present invention.

Figure 6:
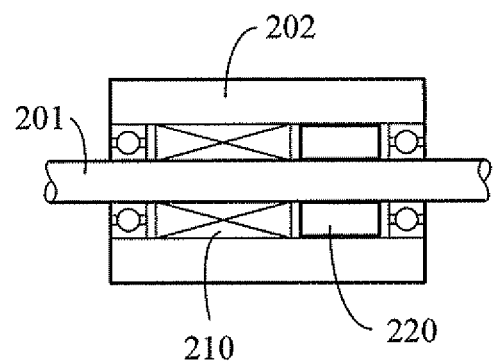
FIG. 6 is a schematic view showing the radial type composite structure, according to the present invention.

According to the controllable composite clutch having limited torque while being in a released state provided by the present invention, a radial composite structure can be adopted, thereby meeting the requirement of the applied space;

FIG. 6 is a schematic view showing the radial type composite structure, according to the present invention;

As shown in FIG. 6, it mainly consists of:

input shaft (201): constituted by a shaft or rotary structure capable of inputting the rotary kinetic energy, and served to be combined at the inner circular input end of the radial clutch (210) and at the inner circular input end of the radial limited torque device (220);

cylindrical outputting rotation part (202): constituted by a cylindrical rotary structure capable of outputting the rotary kinetic energy, and served to be combined at the output end of the radial clutch (210) and at the output end of the radial limited torque device (220);

radial clutch (210): related to a clutch device or a single-way clutch, controlled by manual force or centrifugal force, or controlled by the electric force, and/or magnetic force, and/or mechanical force, and/or air pressure and/or hydraulic force; when being in an engaged state, the radial clutch (210) is served to transfer the rotary kinetic energy between the input shaft (201) and the cylindrical outputting rotation part (202), and when the radial clutch (210) being in a released state, served to terminate the transmission of the rotary kinetic energy between the input shaft (201) and the cylindrical outputting rotation part (202), and the smaller set torque is via the limited torque device 220 to continue transferring the rotary kinetic energy and generating the slip rotational speed differential due to over-torque;

radial limited torque device (220): related to a limited torque device constituted by preload friction, viscous force or fluid damping force, or a controllable limited torque structure controlled by manual force or centrifugal force, or controlled by the electric force, and/or magnetic force, and/or mechanical force, and/or air pressure and/or hydraulic force, equipped with the characteristic of limited torque, wherein the limited torque coupling is performed by the physical limited torque device, such that the rotary kinetic energy between the input shaft (201) and the cylindrical outputting rotation part (202) can be transferred through smaller torque, or the slip rotational speed differential between the input shaft (201) and the cylindrical outputting rotation part (202) is generated due to over-torque; the physical limited torque of the mentioned radial limited torque device (220) is smaller than the engaging torque of the radial clutch (210);

When being applied, the inputting and the outputting function of the mentioned input shaft (201) and the cylindrical outputting rotation part (202) can be switched to input the rotary kinetic energy through the cylindrical outputting rotation part (202) and output the rotary kinetic energy from the input shaft (201).

The mentioned radial limited torque device (220) shown in FIG. 6 is equipped with one or more than one of the following characteristics:

(1) a limited torque device having the set torque, e.g. configured by a pre-stressed limited torque structure; FIG. 3 is a schematic view illustrating the operation characteristic of the limited torque being set as a fixed torque, according to the present invention;

(2) a limited torque device having the gradually-increased torque while the rotation differential being increased, e.g. configured by an eddy current coupling device or viscous oil coupling device; FIG. 4 is a schematic view illustrating the operation characteristic of the limited torque being gradually increased while the rotation differential being increased, according to the present invention;

(3) a limited torque device having the gradually-reduced torque while the rotation differential being increased, e.g. configured by a sliding friction disc or hydraulic coupling device; FIG. 5 is a schematic view illustrating the operation characteristic of the limited torque being gradually reduced while the rotation differential being increased, according to the present invention.

The invention claimed is:

1. A controllable composite clutch comprising:
at least one input shaft, said at least one input shaft being a shaft or rotary structure configured to input rotary kinetic energy, and combinable to an input end of at least one of an axial clutch and a limited torque device;
at least one output shaft, said at least one output shaft being a shaft or rotary structure configured to output the rotary kinetic energy, and combinable to an output end of at least one of the axial clutch and the limited torque device;
said axial clutch being a clutch device or a single-way clutch configured to perform an engaging and releasing function to transfer the rotary kinetic energy between the at least one input shaft and the at least one output shaft; and
the limited torque device being configured to perform limited torque coupling having a smaller set torque,
wherein when said axial clutch is in an engaged state, the axial clutch is configured to transfer the rotary kinetic energy between the at least one input shaft and the at least one output shaft, and when the axial clutch is in a released state, the axial clutch is configured to terminate the transfer of the rotary kinetic energy between the at least one input shaft and the at least one output shaft and the limited torque device is configured to set the smaller set torque to continuously transfer the rotary kinetic energy and/or slip rotational speed differential generated due to over-torque between the at least one input shaft and the at least one output shaft, and
wherein the smaller set torque is smaller than a transmission torque in the engaged state required by the axial clutch.

2. The controllable composite clutch according to claim 1, wherein the axial clutch is controllable by at least one of a manual force, centrifugal force, electric force, magnetic force, mechanical force, pneumatic pressure and hydraulic force.

3. The controllable composite clutch according to claim 1, wherein said limited torque coupling is constituted by at least one of a preload friction, viscous force, fluid damping force, a controllable limited torque structure controlled by manual force or centrifugal force, or controlled by at least one of the electric force, magnetic force, mechanical force, pneumatic pressure and hydraulic force.

4. The controllable composite clutch according to claim 1, wherein an inputting and an outputting function of the at least one input shaft and the at least one output shaft is switchable so that the rotary kinetic energy is inputted through the at least one output shaft and the rotary kinetic energy is outputted from the at least one input shaft.

5. The controllable composite clutch according to claim 1, wherein the axial clutch and the limited torque device are axially installed between the at least one input shaft and the at least one output shaft or are radially installed between the input shaft and a cylindrical outputting rotation part, so that when the axial clutch is controlled to be in the engaged state, the rotary kinetic energy between the input shaft and the output shaft is transferred through the axial clutch; and when the axial clutch is controlled to be in the released state, the limited torque device performs the limited torque coupling, such that the rotary kinetic energy between the at least one input shaft and the at least one output shaft is continued to be input and the slip rotational speed differential being generated due to over-torque can be carried out by the smaller set torque.

6. The controllable composite clutch according to claim 1, wherein the composite clutch comprises a multi-shaft parallel-connected transmission structure comprising at least two input shafts and at least two output shafts, said at least two input shafts being an input shaft and a relay input shaft and said at least two output shafts being an output shaft and a relay output shaft,
wherein two transmission ends of the axial clutch are combined with the input shaft and the output shaft, and two transmission ends of the limited toque device are combined with the relay input shaft and the relay output shaft;
wherein rotary kinetic energy between the input shaft and the relay input shaft is transferred through an active end transmission, and rotary kinetic energy between the output shaft and the relay output shaft is transferred through a passive end transmission, and
wherein the input shaft revolves in the same rotating direction relative to the output shaft, the relay input shaft revolves in the same rotating direction relative to the relay output shaft, a speed ratio between the input shaft and the relay input shaft and a speed ratio between the output shaft and the relay output shaft being the same, wherein the speed ratio between the input shaft and the relay input shaft and the output shaft and the relay output shaft is determined according to actual needs.

7. The controllable composite clutch according to claim 6, wherein the inputting and the outputting function of the mentioned input shaft and the output shaft is switchable so that the rotary kinetic energy is inputted through the output shaft and the rotary kinetic energy is outputted from the input shaft.

8. The controllable composite clutch according to claim 1, wherein the limited torque device is configured to have at least one of the following characteristics:
1) said limited torque device having the set torque configured by a pre-stressed limited torque structure;
2) said limited torque device being configured to have a gradually-increased torque while the rotation differential is increased, said limited torque device being an eddy current coupling device or viscous oil coupling device; and
3) said limited torque device being configured to have a gradually-reduced torque while the rotation differential is increased, said limited torque device being a sliding friction disc or hydraulic coupling device.

9. The controllable composite clutch according to claim 6, wherein the limited torque device is configured to have at least one of the following characteristics:
1) said limited torque device having the set torque configured by a pre-stressed limited torque structure;

2) said limited torque device being configured to have a gradually-increased torque while the rotation differential is increased, said limited torque device being an eddy current coupling device or viscous oil coupling device; and
3) said limited torque device being configured to have a gradually-reduced torque while the rotation differential is increased, said limited torque device being a sliding friction disc or hydraulic coupling device.

10. A controllable composite clutch that is a radial type composite structure comprising:
an input shaft that is a shaft or rotary structure configured to input rotary kinetic energy, and combinable to an inner circular input end of a radial clutch and to an inner circular input end of a radial limited torque device;
a cylindrical outputting rotation part, said cylindrical outputting rotation part being a cylindrical rotary structure configured to output the rotary kinetic energy, and combinable to an output end of the radial clutch and to an output end of the radial limited torque device;
said radial clutch being a clutch device or a single-way clutch; and
said radial limited torque device being a limited torque device configured to provide a smaller set torque by limited torque coupling,
wherein when said radial clutch is in an engaged state, the radial clutch is configured to transfer the rotary kinetic energy between the input shaft and the cylindrical outputting rotation part, and when the radial clutch is in a released state, the radial clutch is configured to terminate the transmission of the rotary kinetic energy between the input shaft and the cylindrical outputting rotation part and the radial limited torque device is configured to set the smaller set torque to continuously transfer the rotary kinetic energy and/or slip rotational speed differential generated due to over-torque between the input shaft and the cylindrical outputting rotation part, and
wherein the smaller set torque is smaller than an engaging torque of the radial clutch in the engaged state.

11. The controllable composite clutch according to claim 10, wherein the limited torque device is configured to have at least one of the following characteristics:
1) said limited torque device having the set torque configured by a pre-stressed limited torque structure;
2) said limited torque device being configured to have a gradually-increased torque while the rotation differential is increased, said limited torque device being an eddy current coupling device or viscous oil coupling device; and
3) said limited torque device being configured to have a gradually-reduced torque while the rotation differential is increased, said limited torque device being a sliding friction disc or hydraulic coupling device.

12. The controllable composite clutch according to claim 10, wherein the radial clutch is controlled by manual force or centrifugal force, or controlled by electric force, magnetic force, mechanical force, pneumatic pressure or hydraulic force.

13. The controllable composite clutch according to claim 10, wherein the limited torque device is constituted by preload friction, viscous force or fluid damping force, or a controllable limited torque structure controlled by manual force or centrifugal force, or controlled by the electric force, and/or magnetic force, and/or mechanical force, and/or pneumatic pressure and/or hydraulic force.

14. The controllable composite clutch according to claim 10, where the inputting and the outputting function of the input shaft and the cylindrical outputting rotation part is switchable so that the rotary kinetic energy is inputted through the cylindrical outputting rotation part and the rotary kinetic energy is outputted from the input shaft.

* * * * *